(12) United States Patent
Alexin

(10) Patent No.: US 7,378,051 B2
(45) Date of Patent: May 27, 2008

(54) METHOD AND APPARATUS FOR SLITTING STEEL SLABS

(75) Inventor: Barry J. Alexin, Monroe, MI (US)

(73) Assignee: Edw. C. Levy Co., Dearborn, MI (US)

( * ) Notice: Subject to any disclaimer, the term of this patent is extended or adjusted under 35 U.S.C. 154(b) by 592 days.

(21) Appl. No.: 10/950,704

(22) Filed: Sep. 27, 2004

(65) Prior Publication Data

US 2005/0067054 A1    Mar. 31, 2005

Related U.S. Application Data

(60) Provisional application No. 60/507,352, filed on Sep. 30, 2003.

(51) Int. Cl.
*B23K 7/10*    (2006.01)

(52) U.S. Cl. .......................... 266/61; 266/48

(58) Field of Classification Search .................. 266/48, 266/61, 62
See application file for complete search history.

(56) References Cited

U.S. PATENT DOCUMENTS

| | | | |
|---|---|---|---|
| 519,071 A | 5/1894 | Philipps | |
| 2,334,250 A | 11/1943 | Cassens et al. | 266/23 |
| 2,672,529 A | 3/1954 | Villard, Jr. | 179/171 |
| 2,684,434 A | 7/1954 | Burey | 240/6.4 |
| 2,746,686 A | 5/1956 | Loveland et al. | 236/94 |
| 3,588,066 A | 6/1971 | Reinfeld et al. | |
| 3,862,749 A | 1/1975 | Fieser et al. | 148/9.5 |
| 3,953,005 A | 4/1976 | Rokop et al. | |
| 4,139,180 A | 2/1979 | Itani et al. | 266/69 |
| 4,186,632 A | 2/1980 | Leslie et al. | |
| 4,201,371 A | 5/1980 | Pillon | 266/50 |
| 4,297,151 A | 10/1981 | Hoffken et al. | 148/9 R |
| 4,329,187 A | 5/1982 | Ushioda et al. | 148/9 R |

(Continued)

FOREIGN PATENT DOCUMENTS

CA    2 383 317    10/2002

(Continued)

OTHER PUBLICATIONS

PCT International Search Report, no date.

*Primary Examiner*—Scott Kastler
(74) *Attorney, Agent, or Firm*—Honigman Miller Schwartz & Cohn LLP

(57) ABSTRACT

A cutting table assembly for oxy cutting comprising a cutting table having a slab loading face and mounted for pivotal movement between a loading position in which the loading face is generally horizontal and a cutting position in which the face is oblique, and a pair of torches mounted on the table. The loading face is constituted by a pair of loading subfaces separated by a slot and the torches are mounted in the slot below the loading face. The torches are positioned at opposite ends of the slot prior to the initiation of the cutting action and, upon the initiation of the cutting action, move toward each other and cut into opposite ends of the slab. A pair of gantries are mounted on the table and each carries a deburring device positioned in overlying opposition to a respective torch. Each gantry further includes a plurality of spaced downwardly directed nozzles which are supplied with compressed air to generate an air curtain.

22 Claims, 8 Drawing Sheets

U.S. PATENT DOCUMENTS

| | | | |
|---|---|---|---|
| 4,379,002 A | 4/1983 | Saito et al. | 148/9 R |
| 4,389,261 A | 6/1983 | Donze et al. | 148/9 R |
| 4,602,967 A | 7/1986 | Komma et al. | 148/9 R |
| 4,809,956 A | 3/1989 | Donze | 266/48 |
| 4,923,527 A | 5/1990 | Ludwigson | 148/9 R |
| 5,102,473 A | 4/1992 | Grohmann | 148/9 R |
| 5,196,071 A | 3/1993 | Voye, Jr. | 148/194 |
| 5,256,212 A | 10/1993 | Magnuson | 148/194 |
| 5,597,030 A | 1/1997 | Lotz et al. | 164/263 |
| 5,626,181 A | 5/1997 | Lotz et al. | 164/263 |
| 5,765,271 A | 6/1998 | Lotz et al. | 29/33 |
| 6,060,679 A | 5/2000 | Ludwigson et al. | 219/121.44 |
| 6,165,410 A | 12/2000 | Crees et al. | 266/49 |
| 6,170,139 B1 | 1/2001 | Lotz | 29/33 |
| 6,261,512 B1 | 7/2001 | Donze et al. | 266/48 |
| 6,334,906 B1 | 1/2002 | Donze et al. | 148/203 |
| 6,534,739 B2 | 3/2003 | Donze et al. | 219/121.39 |
| 6,712,911 B2 | 3/2004 | Donze et al. | 148/196 |
| 7,007,737 B2 * | 3/2006 | Alexin | 164/263 |
| 2002/0158375 A1 | 10/2002 | Donze et al. | 266/58 |
| 2003/0037841 A1 | 2/2003 | Bissonnette | 148/196 |
| 2005/0067054 A1 * | 3/2005 | Alexin | 148/194 |

FOREIGN PATENT DOCUMENTS

| | | |
|---|---|---|
| DE | 3742175 C1 | 1/1989 |
| EP | 1252960 A1 | 10/2002 |
| EP | 1413379 A1 | 4/2004 |
| EP | 1413380 A1 | 4/2004 |
| FR | 2 308 458 | 11/1976 |
| FR | 2 635 284 | 11/1988 |
| FR | 2 672 529 | 2/1991 |
| FR | 2 684 434 | 12/1991 |
| FR | 2 695 051 | 8/1992 |
| FR | 2 746 686 | 3/1996 |
| WO | WO94/16270 | 7/1994 |
| WO | WO95/10734 | 4/1995 |
| WO | WO96/18071 | 6/1996 |
| WO | WO96/26806 | 9/1996 |
| WO | WO98/43772 | 10/1998 |
| WO | WO01/08842 A1 | 2/2001 |
| WO | WO01/28727 A1 | 4/2001 |

* cited by examiner

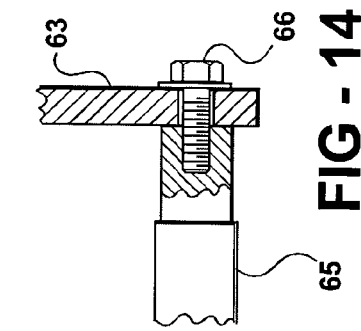
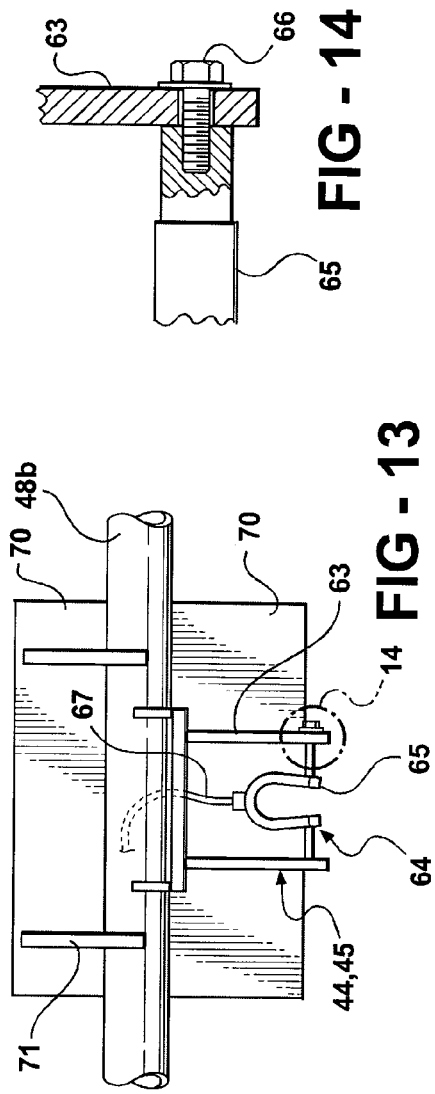
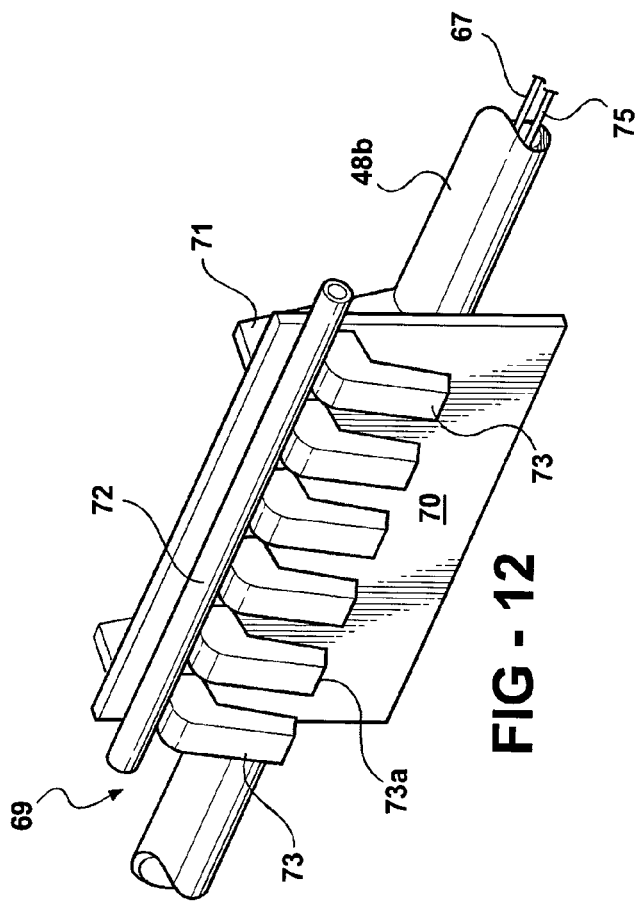
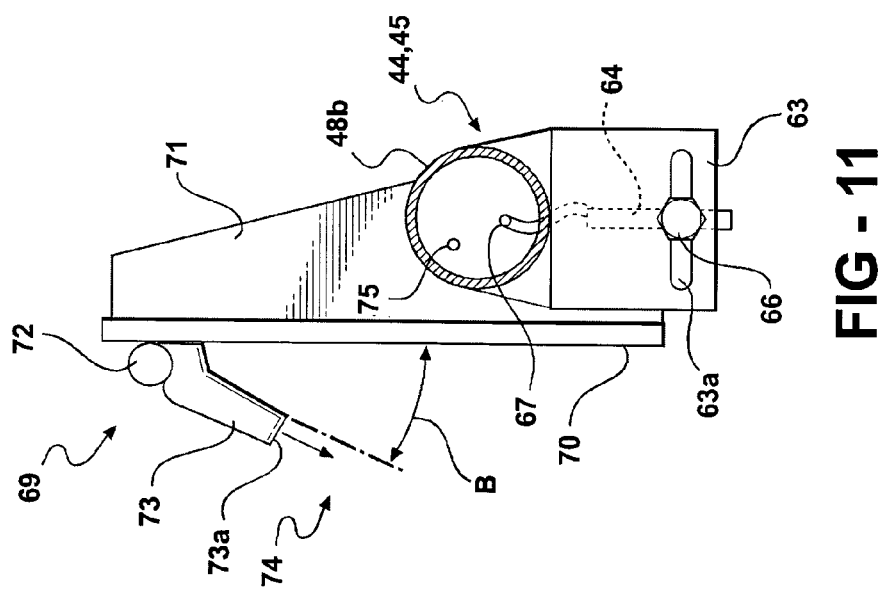

ology, the method includes the further step of moving the slabs selectively laterally on the loading face to vary the location of the flame cut performed by the torch.

According to a further feature of the invention methodology, the torch comprises a first torch; the method includes the further step of mounting a second torch on the table with the second torch positioned in the slot below the loading face; and the method includes the further step of selectively moving the first and second torches along the slot in a manner to, in combination, provide a flame cut extending the entire length of a slab positioned on the loading face.

According to a further feature of the invention methodology, the method includes the further step of providing an air curtain system between the first and second torches.

According to a further feature of the invention methodology, the method comprises the further step of providing first and second deburring devices on the table above the loading surface and in respective opposition to the first and second torches, and the air curtain system comprises first and second air curtains generated proximate the first and second deburring devices respectively.

According to a further feature of the invention methodology, the first and second deburring devices are supported on first and second support structures overlying the loading surface and the air curtains are generated at and extend downwardly from the respective support structures.

According to a further feature of the invention methodology, each air curtain is generated by a plurality of spaced downwardly directed nozzles mounted on the respective support structure.

According to a further feature of the invention methodology, a spark shield is mounted on each support structure. In the disclosed embodiment of the invention each spark shield comprises a plate mounted and extending downwardly from the respective support structure.

According to a further feature of the invention methodology, each torch is mounted for movement along substantially the entire length of the slot whereby either torch, in solo, can perform the total flame cut.

The apparatus of the invention comprises a cutting table having a slab loading face; means mounting the table for movement between a loading position in which the loading face is generally horizontal and a cutting position in which the face is oblique; and a torch mounted on the table below the loading face.

According to a further feature of the invention apparatus, the table assembly is mounted for pivotal movement between its loading and cutting positions.

According to a further feature of the invention apparatus, the loading face is constituted by a pair of loading subfaces separated by a slot and the torch is mounted in the slot below the loading face and is moveable along the length of the slot.

According to a further feature of the invention apparatus, the slot extends parallel to the pivot axis.

According to a further feature of the invention apparatus, the table assembly further includes a deburring device mounted on the table above the loading face in opposition to the torch and the deburring device is mounted for movement on the table in synchronization with the movement of the torch in the slot.

According to a further feature of the invention apparatus, the oblique orientation of the loading face lies at an angle of from 10° to 20° to the vertical.

According to a further feature of the invention apparatus, the torch comprises a first torch; the table assembly further includes a second torch positioned in the slot below the

METHOD AND APPARATUS FOR SLITTING STEEL SLABS

RELATED APPLICATIONS

This application claims the priority of U.S. Provisional Patent Application No. 60/507,352, filed on Sep. 30, 2003.

BACKGROUND OF THE INVENTION

This invention relates to oxygen cutting apparatus ad procedures and more specifically to apparatus and procedures for slitting a steel slab utilizing an oxy torch.

Various procedures are known for slitting steel slabs. For example, it is known to place a slab edgewise on a series of feed rollers that carry the slab forward past an oxy cutting torch between pairs of loose mounted vertical rollers. It is also known to slit or cut a slab while lying horizontally or on edge and suspended by means of electro magnets located below the feed rollers.

Whereas these and other slab cutting procedures are generally satisfactory, they are not amenable to the provision of a high volume, high quality manufacturing line operation for slitting slabs.

SUMMARY OF THE INVENTION

This invention provides both method and apparatus features and advantages.

The methodology of the invention relates to the flame cutting of a slab utilizing a torch.

According to an important feature of the invention methodology, a cutting table is provided having a slab loading face; the table is mounted for movement between a loading position in which the loading face is generally horizontal and a cutting position in which the loading face is oblique; a slab is loaded onto the loading face with the table in the loading position; the table and slab are moved to the cutting position to position the slab in an oblique orientation; the torch is positioned proximate the underface of the obliquely oriented slab; and the torch is moved relative to the table to flame cut the slab.

According to a further feature of the invention methodology, the table is mounted for pivotal movement between its loading and cutting positions.

According to a further feature of the invention methodology, the torch is mounted on the table for movement with the table from the loading to the cutting position.

According to a further feature of the invention methodology, the method includes the further step of positioning a deburring device proximate the outer face of the obliquely oriented slab in general opposition to the torch.

According to a further feature of the invention methodology, the deburring device is mounted on the table for movement with the table from the loading to the cutting position.

According to a further feature of the invention methodology, the oblique orientation of the table face lies at an angle of from 10° to 20° from the vertical.

According to a further feature of the invention methodology, the slab loading face is constituted by a pair of slab loading subfaces separated by a longitudinal slot, and the torch is positioned in the slot beneath the subfaces and is moveable along the length of the slot. In the disclosed embodiment of the invention, the slot extends parallel to the pivot axis of the table.

loading face and moveable along the slot; and the first and second torches are selectively moveable in the slot to, in combination, provide a flame cut along an entire dimension of a slab positioned on the loading face.

According to a further feature of the invention apparatus, each torch is mounted for movement substantially the entire length of the slot whereby either torch, in solo, can perform the flame cut along the entire dimension of the slab.

BRIEF DESCRIPTION OF THE DRAWINGS

The description herein makes reference to the accompanying drawings wherein like reference numerals refer to like parts throughout the several views, and wherein:

FIGS. 11, 12, 13 and 14 are fragmentary views showing details of a deburring device, an air curtain assembly, and a spark shield utilized in the invention table; and FIG. 15 is a schematic view of an alternate lateral slab adjustment mechanism.

DESCRIPTION OF THE PREFERRED EMBODIMENT

Figure 1:
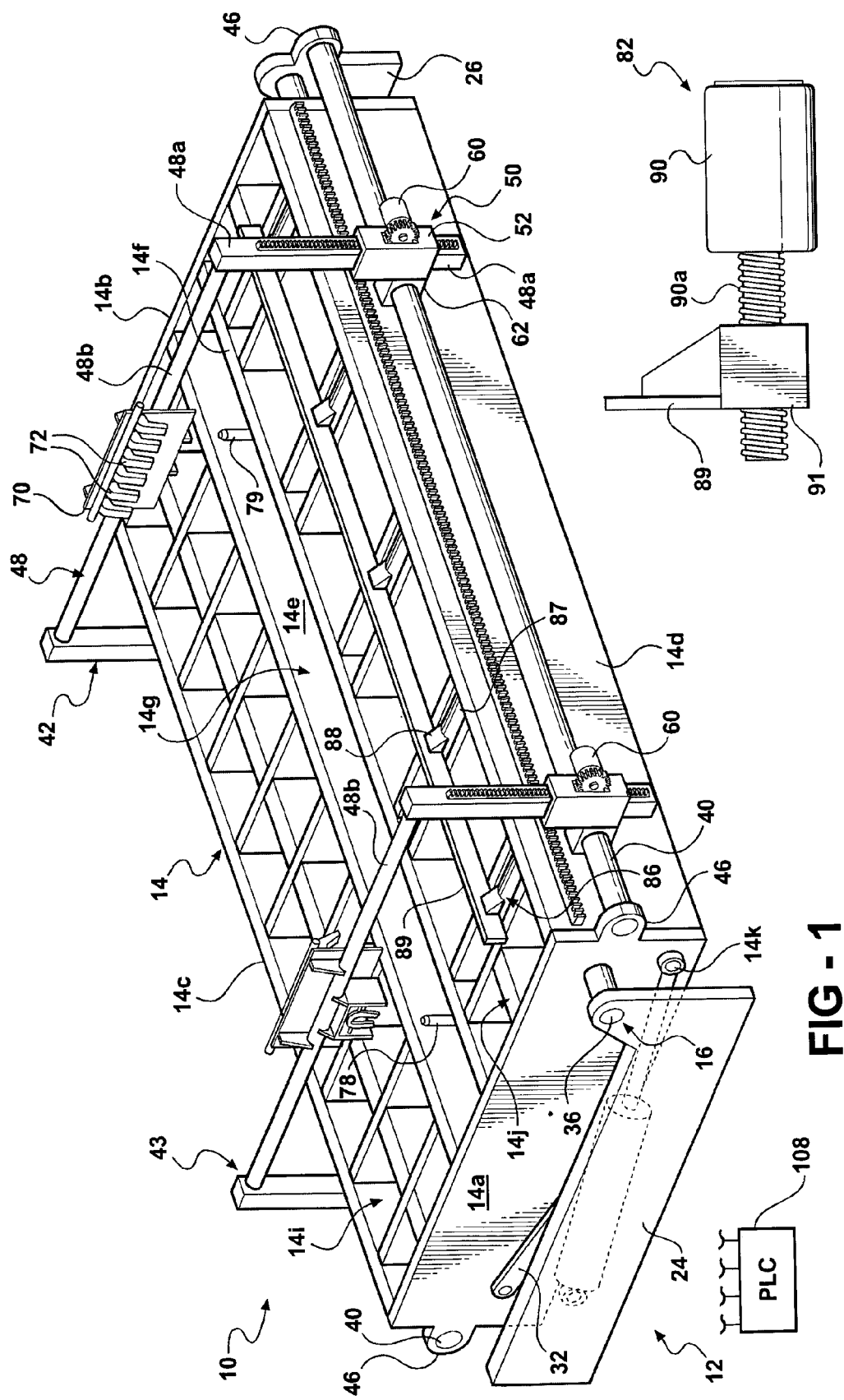
FIG. 1 is a perspective view of a cutting table according to the invention.
Figure 2:
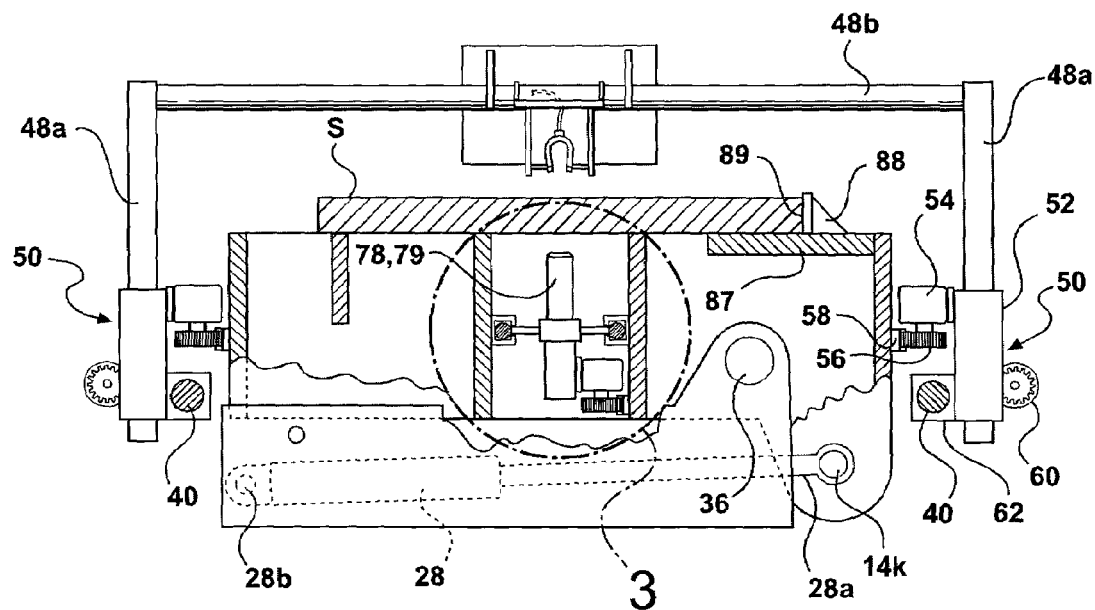
FIG. 2 is an end view, partially in section, of the table of FIG. 1.

The invention cutting table 10, broadly considered, includes a base assembly 12, a table assembly 14, a pivot assembly 16, a deburring assembly 18, a torch assembly 20 and a lateral adjustment assembly 22.

Base assembly 12 is shown schematically and includes spaced base members 24 and 26 adapted to be fixedly secured to a support surface or floor.

Table assembly 14 includes end plates 14a and 14b, side rails 14c and 14d, central longitudinal beams 14e and 14f defining a slitting slot 14g therebetween, and cross members 14h coacting with members 14c, 14d, 14e and 14f to form a lattice work configuration on an upper loading face 14h of the table. Loading face 14h will be seen to be constituted by a pair of slab loading subfaces 14i and 14j separated by slot 14g.

Pivot assembly 16 includes a pair of hydraulic rams 28 positioned proximate each base member 24, 26 between the respective base member and a table end plate 14a, 14b, and a pair of links 30, 32 proximate each end of the table assembly. The piston rod 28a of each ram 28 is pivotally secured to a pin 14ki carried by a respective end plate 14a, 14b and the other end 28b of the ram is secured to a pin 24a, 26a carried by a respective base member 24, 26. Each link 32 is pivotally secured at its lower end to a respective base member 24, 26, each link 30 is pivotally secured at its upper end to a respective end plate 14a, 14b, and the inboard ends of the links are pivotally secured at 34.

The table assembly is pivotally secured to tower portions 24a, 26a of the base members by pivot pins 36 carried by end plates 14a, 14b and spaced from the pivot axes of pins 14k. The parameters of the various aspects of the table assembly are chosen such that contracting movement of the rams 28 has the effect of pivoting the table assembly upwardly about the axes of pins 36 with the extent of upward movement being determined and delimited by run out of the rams and/or by ultimate alignment of links 30 and 32. For example, the parameter may be chosen such that the table is pivoted upwardly in response to contraction of the rams to a position in which the upper face of the table lies in a primary plane at an angle α of between 10° and 20° from the vertical plane. As an alternate to the disclosed hydraulic ram pivoting arrangement, the pivotal movement of the table may be provided utilizing hydraulic rotary oscillators.

Deburring assembly 18 includes a pair of guide rails 40, a pair of gantry assemblies 42/43, and a pair of deburring devices 44/45.

Guide rails 40 have a circular cross-sectional configuration and are mounted by brackets 46 in spaced relation to a respective side rail 14c, 14d.

Each gantry assembly 42/43 includes a gantry 48 of inverted "U" configuration and guide structures 50 receiving the lower ends of the vertical arm portions 48a of the gantry. Each gantry further includes a tubular horizontal cross member 48b extending between the upper ends of the vertical arm portions 48a. Each guide structure 50 includes a sleeve member 52 slidably receiving the lower end of a respective gantry arm portion 48a, an electric motor 54 secured to the sleeve 52 and including a pinion 56 engaging a rack 58 secured to and extending along a respective table side rail 14c, 14d, an electric motor 60 carried by the sleeve 52 and including a pinion engaging a rack defined on a respective gantry arm portion 48a, and a bracket 62 secured to the sleeve 52 and slidably mounted on a respective rail 40.

Each deburring device 44/45 includes a pair of bracket plates 63 secured to an underface of the respective cross-member 48b and a deburring spider 64. Spider 64 is positioned between plates 63 via a rod 65. Spider 64 may be pivoted on rod 65 to adjust the angular position of the spider and the linear position of the rod and thereby of the spider may be adjusted by loosening/tightening bolts 66 threadably received in the ends of rod 65 and received in slots 63a in bracket plates 63. A line 67 is routed through cross-member 48b for connection to spider 64 for the delivery of oxygen to the spider.

Each gantry assembly 42/43 further includes a spark shield 68 and an air curtain assembly 69.

Spark shield 68 comprises a plate 70 secured to brackets 71 extending upwardly from cross member 48b proximate the respective deburring device 44/45. Plate 70 extends downwardly from cross member 48b in shielding relation to the respective deburring spider 64.

Air curtain assembly 69 includes a manifold pipe 72 mounted along an upper edge of plate 70 and a plurality of nozzles 73 threaded into pipe 72 at laterally spaced locations. Each nozzle 73 may, for example, comprise a unit available from Spraying Systems Company of Wheaton, Ill. as Windjet Nozzle Number AA727-1/4. The fan shaped discharge orifices 73a of the several nozzles coact to generate a continuous curtain of air 74 extending downwardly at an angle β of, for example, 45° from the vertical. Compressed air is supplied to manifold pipe 72 for delivery to nozzles 73 via a line 75 extending through tubular cross member 48b.

Figure 3:
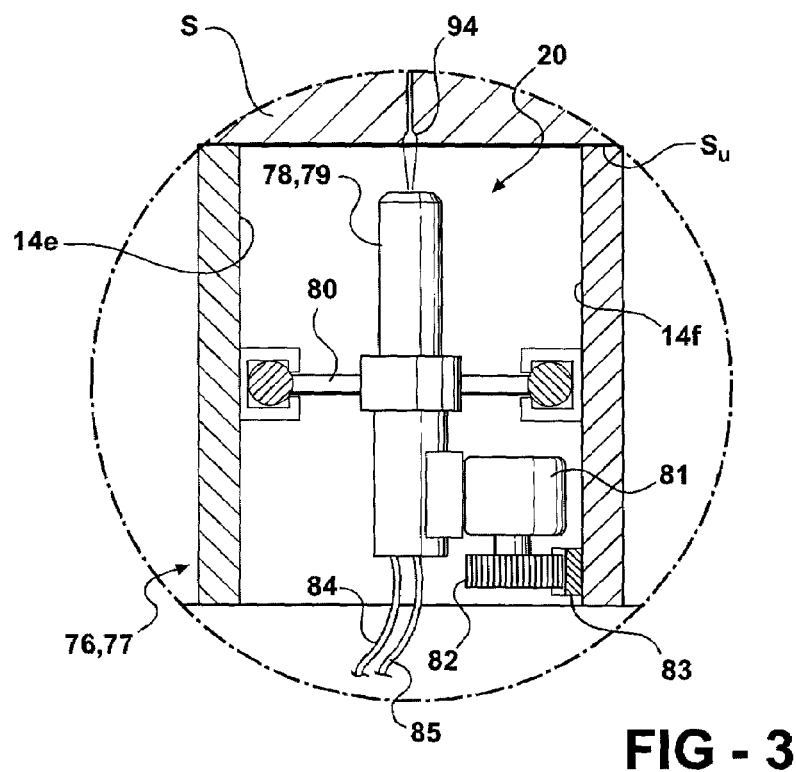
FIG. 3 is detail view within circle 3 of FIG. 2.

Torch assembly 20, as best seen in FIG. 3, includes a pair of torch structures 76/77. Torch structure 76 includes a torch 78 and torch structure 77 includes a torch 79. Each torch structure further includes opposed guide arms 80 guiding in tracks defined by beams 14a and 14f, and an electric motor 81 carried by the lower end of the torch and including a pinion 82 engaging a rack 83 extending along the lower edge of beam 14f. Gasses are supplied to the torches 78/79 to facilitate the oxy cutting process. For example, oxygen may be supplied to the torches 78/79 via lines 84 and natural gas may be supplied to torches via lines 85.

Lateral adjusting assembly 82 includes a plurality of hydraulic ram assemblies 86 positioned in longitudinally spaced niches 14l in the table assembly and each including a cylinder housing 87 driving an external piston member 88. Piston members 88 are in turn coupled to a common push rail 89 extending for the greater part of the length of the table. Alternatively, as seen in FIG. 15, the lateral adjusting assembly may comprise a plurality of electric motors 90 driving screw shafts 90a which in turn drive ball screws 91 connected to push rail 89.

OPERATION

The operation of the invention cutting table is best seen in sequential FIGS. 6, 7, 8 and 9.

Figure 6:
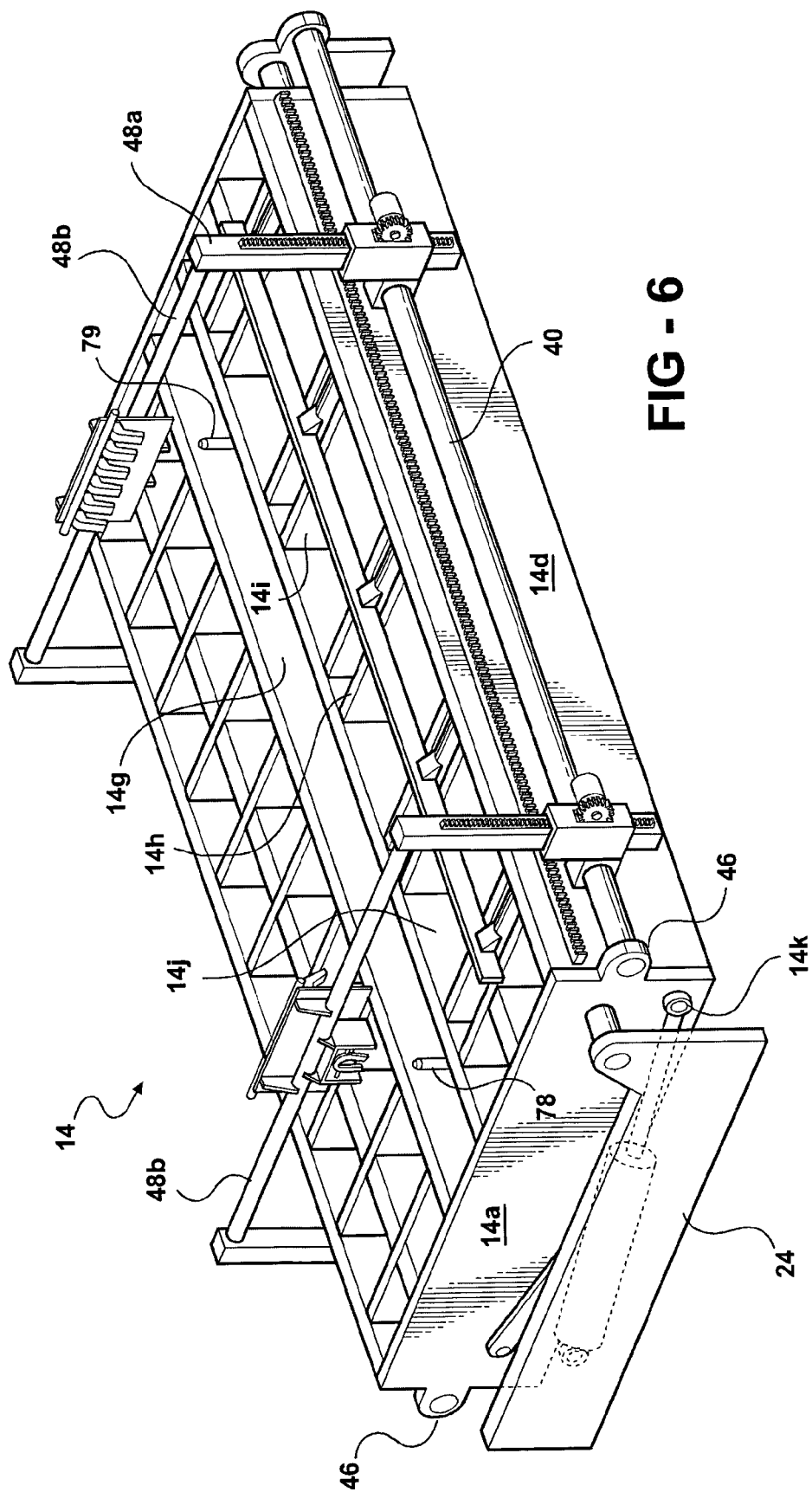
FIGS. 6, 7, 8 and 9 are sequential somewhat schematic views showing the operation of the table in performing an oxy cutting procedure on a steel slab.

With the table in the horizontal or lowered position seen in FIG. 6 and the respective torches 78/79 positioned at opposite ends of slot 14g and the respective gantries positioned in overlying relation to the respective torches, a steel slab S is delivered to the upper face of the table utilizing, for example, an overhead crane employing a magnetic grabber. After each slab has been delivered to the upper face of the table, and depending upon the cutting requirements, the lateral adjustment assembly 22 may be actuated to activate each of the ram assemblies 86 to move the rail 89 laterally across the upper face of the table to adjust the lateral position of the slab on the top of the table and thereby adjust the location of the cutting slit to be provided.

Figure 4:
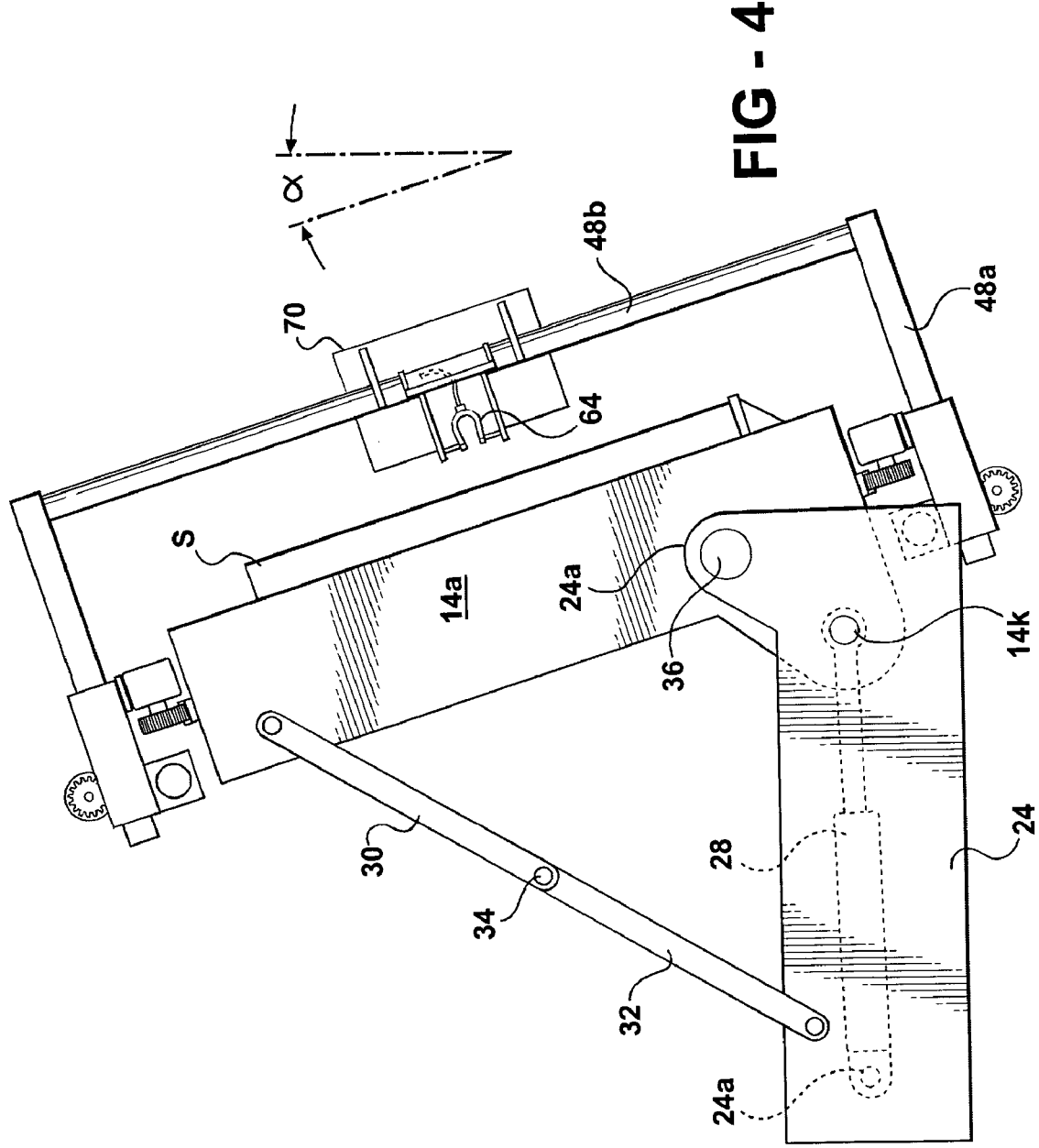
FIG. 4 is a view of the table shown in tilted position.
Figure 5:
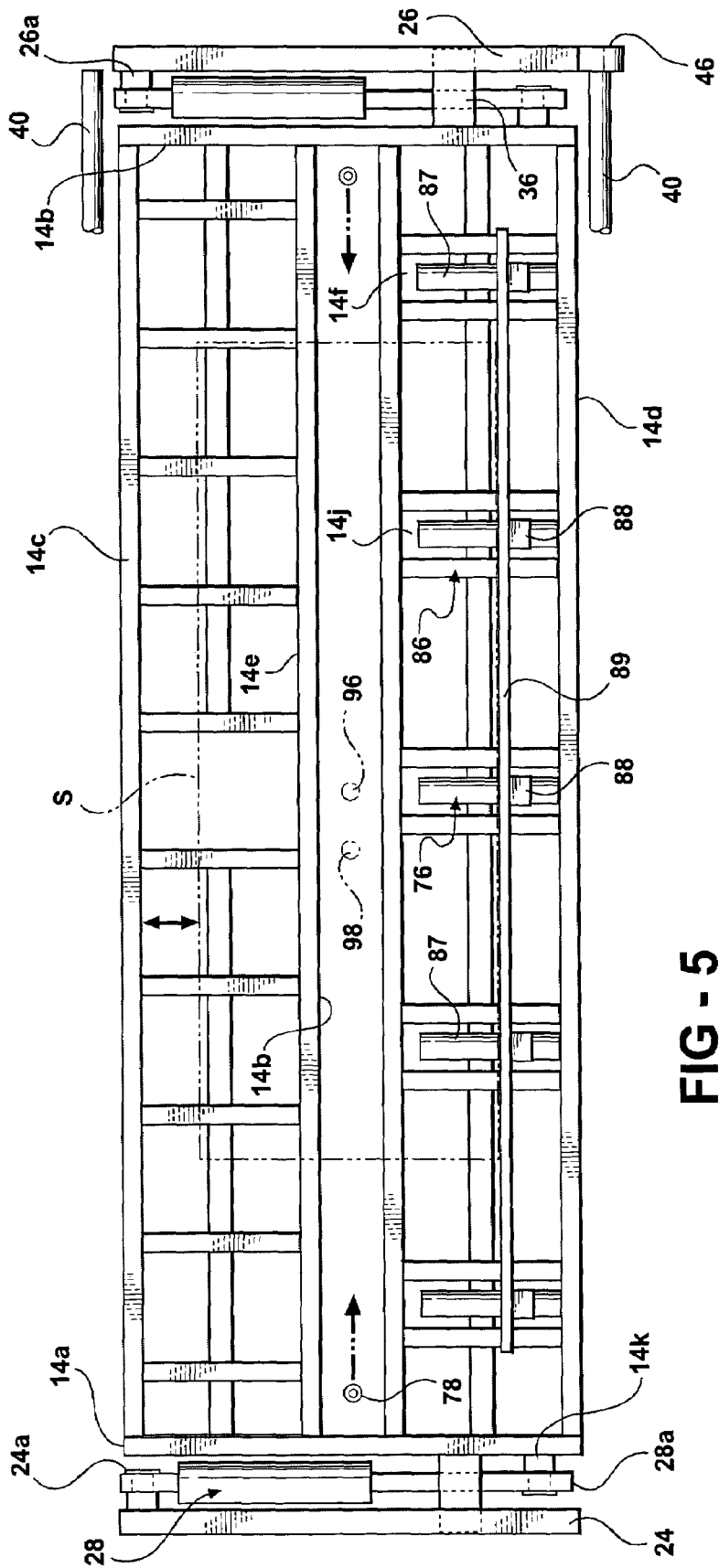
FIG. 5 is a plan view of the table.
Figure 7:
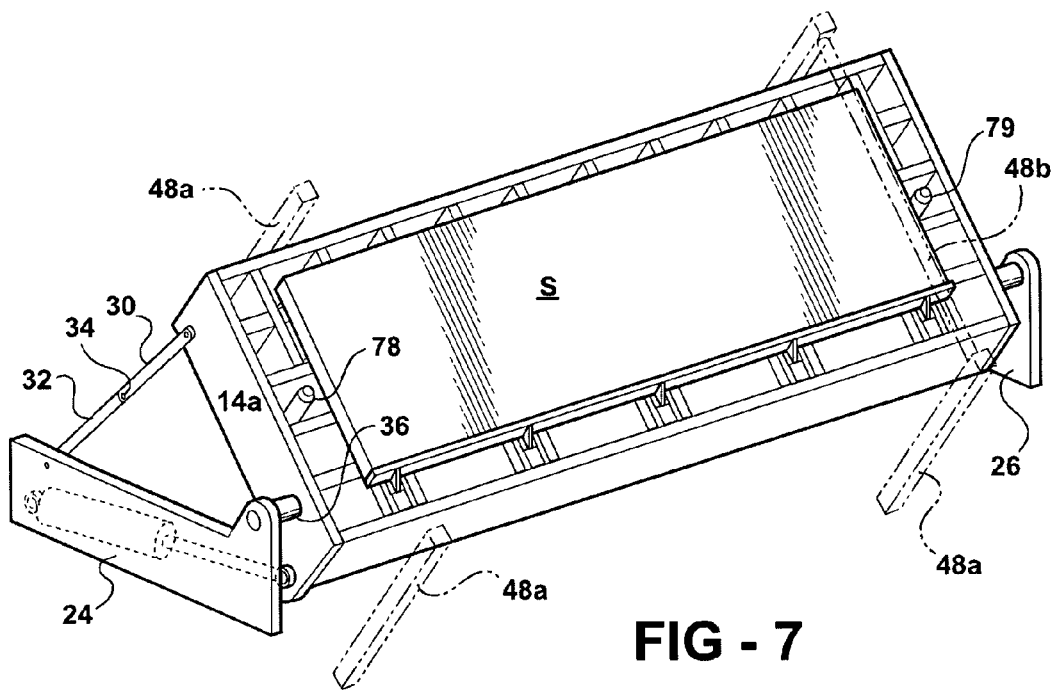

Rams 28 may now be actuated to tilt the table assembly to the upwardly tilted position seen in FIG. 7 in which the upper face of the table assembly lies at an angle $\alpha$ (FIG. 4) of between 10 and 20° from the vertical plane. In this upwardly tilted position the rail 89 defines the lateral position of the slab on the upper face of the table and prevents the slab from sliding off of the table by gravity forces.

Figure 8:
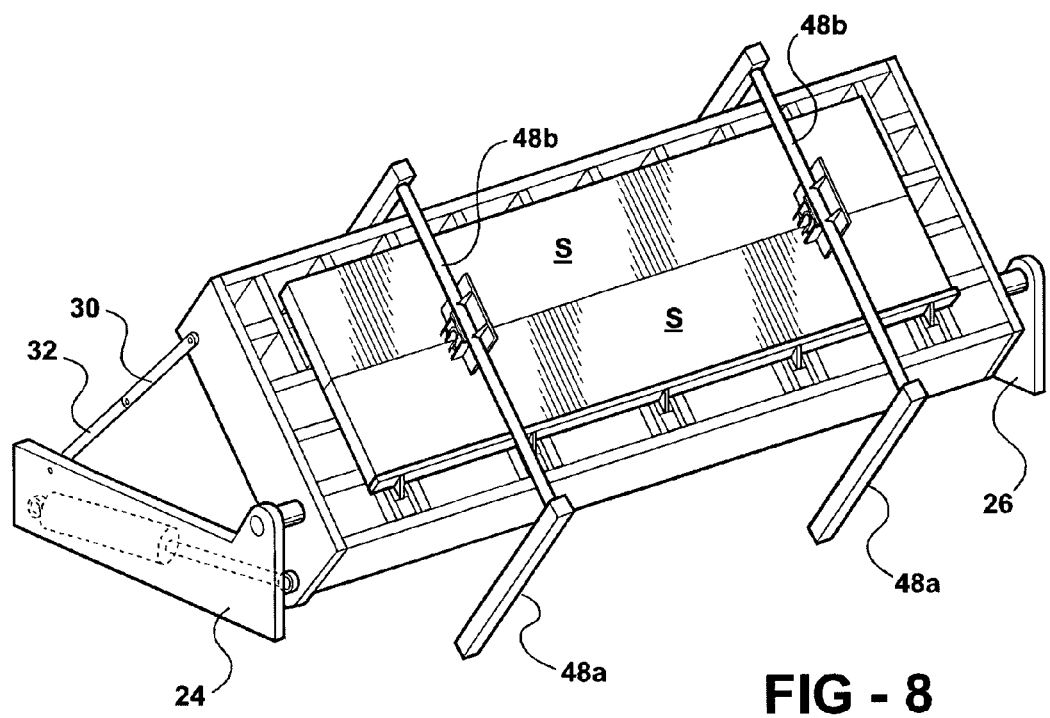

At this point, and as seen in FIG. 8, motors 60 are actuated to adjust the vertical positions of the gantry assemblies whereafter the motors 54 are actuated to move the gantry assemblies along the rails 40 and motors 66 are simultaneously actuated to move the torches 78/79 within the slitting slot 14g in synchronism with the movement of the respective gantries and thereby in synchronism with the movement of the respective deburring device 44/45. Simultaneous with the concurring movement of the deburring devices 44/45 and the torches 78/79, oxygen and natural gas are delivered to the torches via conduits 72 and 74, oxygen is delivered to the deburring devices 44/45 via conduits 67, and the torches are suitably ignited to provide torch flames 94 impacting against the lower face $S_1$ of the slab.

The torches and respective deburring devices are moved from their start positions in the respective ends of the slot 14g toward the center of the slot so that the torches move toward each other and cut the slab from opposite ends of the slab.

Preferably, the movement of the torches is somewhat staggered. For example, torch 78 may begin to make a cut from one end of the slab and, approximately 10 seconds later, torch 79 may begin to make a cut from the opposite end of the slab. The two torches are now traveling inwardly toward the middle of the slab. The movement of torch 78 continues until reaching a limit switch 96 at a predetermined position. Once the limit switch 96 is actuated, torch 78 and its associated gantry are stopped and returned to their home or start positions but torch 79 and its associated gantry continues to move inward until it reaches a further limit switch 98 at a predetermined position whereafter it is stopped and returned, together with its associated deburring device, to its home or start position. The limit switch parameters are chosen such that torch 79 is allowed to travel slightly past the end limit of the torch 78 movement to insure a complete cut of the slab. If either torch becomes inoperative, a manual override may be thrown to allow the operative torch to complete the entire cut in solo.

Figure 10:
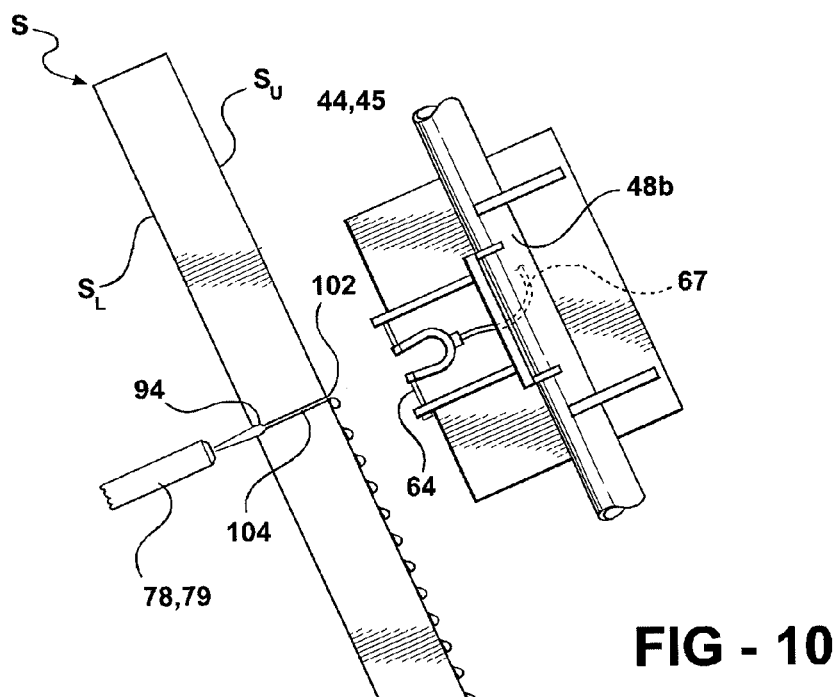
FIG. 10 is a detailed and somewhat schematic view showing the coaction of the torch utilized in the invention with a deburring device utilized in the invention.

Whereas the respective torches and deburring devices are moved along the slab in synchronism, each torch preferably moves along the slab slightly ahead of the respective deburring device to optimize the combined action of the torch and the deburring device. Specifically, as best seen in FIG. 10, the parameters of the various elements of the table assembly are coordinated such that the liquid slag 102 forming on the upper face $S_u$ of the slab proximate the kerf 104 being formed in the slab by the flames 94 is maintained in a liquid state by the oxygen emitting from the deburring devices 44/45 so that the slag will be maintained in a liquid form and allowed to flow downwardly along the upper face $S_u$ of the slab before solidifying so that the upper face remains free of any slag or bearding as a result of the cutting action. As the liquid slag drops off of the lower edge $S_{le}$ of the slab, it is allowed to solidity and is deposited into a suitable receptacle 106.

As the torches approach each other while moving toward the center of the slab, the spark shield and the air curtain operate to minimize damage to the torches and deburring devices by the hot metal and airborne dross generated by the cutting action. Specifically, the air curtain acts to deflect and cool the exit dross whereby to prolong the life of the deburring devices and associated apparatus and the spark shield precludes sparks from one torch/deburring assembly from attacking the deburring device of the other torch/deburring assembly. As best seen in FIG. 1, the air curtains are provided on the leading faces of the gantries as the gantries approach each other whereby to maximize the protective action of the air curtains.

Figure 9:
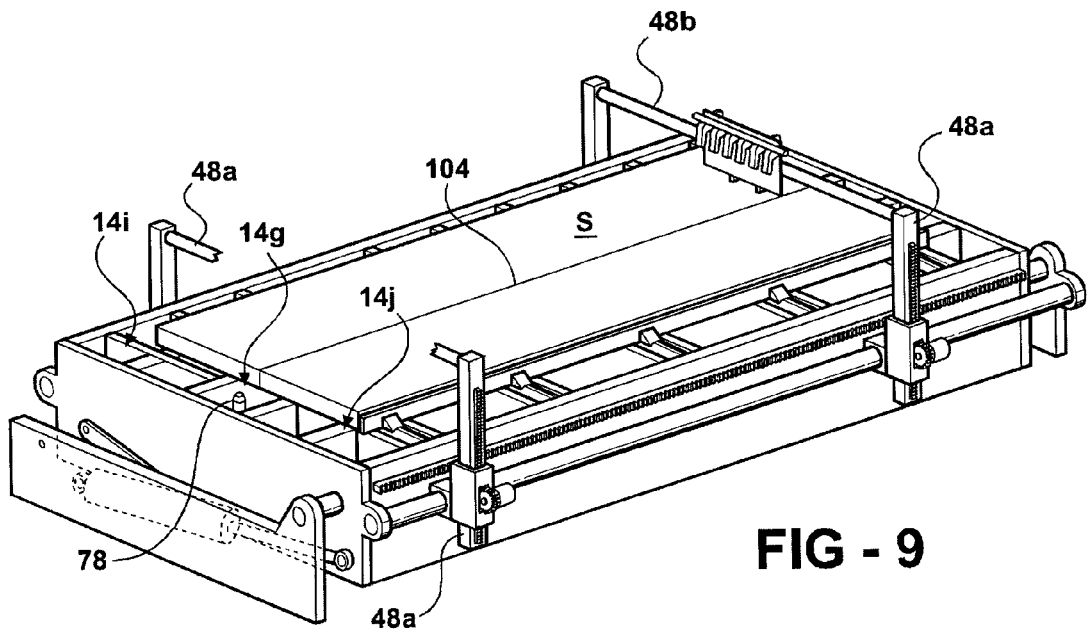

Following the movement of the torches and gantries to their starting positions, and as best seen in FIG. 9, the table rams 28 are actuated in a sense to extend the rams and move the table back to the lowered position seen in FIG. 9, whereafter the overhead crane and associated magnetic grab devices may be employed to remove the sections of the cut slab from the table to prepare the table assembly for a subsequent cutting operation with respect to a further slab.

The movement of the gantries and torches back to their starting positions may be accomplished prior to movement of the table back to its horizontal starting position or may be performed during the movement of the table back to its horizontal position.

Suitable controls would of course be provided, such as the PLC illustrated schematically in FIG. 1 at 108, to control and coordinate the movement of the various components of the table assembly.

The invention has been found to provide a cut slab having a clean, smooth cut edge whereby to eliminate any need for any further grinding or other finishing operations with respect to the slab.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A cutting table assembly for cutting a steel slab comprising:
   a cutting table including:
      a slab loading face;
      means for mounting the cutting table for movement between
         a loading position in which the slab loading face is generally horizontal, and
         a cutting position in which the slab loading face is oblique; and
      a torch, wherein the torch is mounted on the cutting table below the slab loading face.

2. The cutting table assembly according to claim 1, wherein the cutting table assembly is mounted for pivotal movement between its loading and cutting positions.

3. The cutting table assembly according to claim 1, wherein the slab loading face is constituted by,
   a pair of loading sub-faces separated by a slot, and, wherein the torch is mounted in the slot below the slab loading face, and wherein the torch is moveable along the length of the slot.

4. The cutting table assembly according to claim 3, wherein the cutting table assembly is mounted for pivotal movement between its loading and cutting positions, and, wherein the slot extends parallel to the pivot axis.

5. The cutting table assembly according to claim 3, wherein the cutting table assembly further includes:
   a deburring device mounted on the cutting table above the slab loading face in opposition to the torch; and, wherein the deburring device is mounted for movement on the cutting table in synchronization with the movement of the torch in the slot.

6. The cutting table assembly according to claim 1, wherein the oblique orientation of the slab loading face lies at an angle of from 10° to 20° to the vertical.

7. The cutting table assembly according to claim 3, wherein the torch comprises:
   a first torch;
   a second torch positioned in the slot below the slab loading face and moveable along the slot, whereby either of the first and second torches, in solo, can perform the flame cut along the entire dimension of the slab.

8. The cutting table assembly according to claim 7, wherein the first and second torches are selectively moveable in the slot to, in combination, provide a flame cut along an entire dimension of a slab positioned on the slab loading face.

9. The cutting table assembly according to claim 7, wherein the cutting table assembly further includes:
   a first deburring device mounted on the cutting table above the slab loading face in opposition to and moveable in synchronization with the first torch, and
   a second deburring device mounted on the cutting table above the slab loading face in opposition to and moveable in synchronization with the second torch.

10. The cutting table assembly according to claim 7, wherein the cutting table assembly further includes:
    means for generating first and second air curtains wherein the means for generating first and second air curtains is disposed between the first and second torches.

11. The cutting table assembly according to claim 10, wherein the cutting table assembly further includes:
    a first deburring device mounted on the cutting table above the slab loading face in opposition to and moveable in synchronization with the first torch, and
    a second deburring device mounted on the cutting table above the slab loading face in opposition to and moveable in synchronization with the second torch, and wherein the first and second air curtains are generated proximate the first and second deburring devices respectively.

12. The cutting table assembly according to claim 11, wherein the first and second deburring devices are supported on,
    first and second support structures overlying and moveable along the loading surface, and, wherein the air curtains are generated at and extend downwardly from the first and second support structures.

13. The cutting table assembly according to claim 11, wherein each air curtain is generated by,
    a plurality of spaced, downwardly directed nozzles mounted on the first and second support structure.

14. The cutting table assembly according to claim 11, wherein the cutting table assembly further includes:
    a spark shield mounted on each first and second support structure.

15. The cutting table assembly according to claim 14, wherein the spark shield includes:
    a plate mounted on and extending downwardly from the first and second support structure.

16. The cutting table assembly according to claim 1, wherein the means for mounting the cutting table for movement includes:
    a hydraulic pivot assembly.

17. The cutting table assembly according to claim 16, further comprising:
    a pair of end plates; and
    a pair of base members, wherein the hydraulic pivot assembly includes
       a pair of hydraulic rams each of which includes a piston rod, wherein the piston rod of each hydraulic ram of the pair of hydraulic rams is pivotably secured to a first pin carried by one of said pair of end plates, wherein an end of each hydraulic ram is secured to a second pin carried by one of said pair of base members; and
       a pair of links each including a first link and a second link, wherein the first link is pivotably-secure to the second link, wherein the first link is pivotably secured to one of said pair of base members, wherein the second link is pivotably-secured to one of said pair of end plates.

18. The cutting table assembly according to claim 1, wherein the means for mounting the cutting table for movement includes:
    hydraulic rotary oscillators.

19. A cutting table assembly for cutting a steel slab comprising:
    a cutting table including—a slab loading face, wherein the slab loading face is constituted by
       a pair of loading sub-faces separated by a slot, and, wherein the torch is mounted in the slot below the slab loading face, and wherein the torch is moveable along the length of the slot;

means for mounting the cutting table for movement between a loading position in which the slab loading face is generally horizontal, and a cutting position in which the slab loading face is oblique;

a torch, wherein the torch is mounted on the cutting table below the slab loading face, wherein the torch comprises
  a first torch,
  a second torch positioned in the slot below the slab loading face and moveable along the slot, whereby either of the first and second torches, in solo, can perform the flame cut along the entire dimension of the slab; and means for generating first and second air curtains, wherein the means for generating first and second air curtains is disposed between the first and second torches.

20. The cutting table assembly according to claim 19, wherein the cutting table assembly further includes:
  a first deburring device mounted on the cutting table above the slab loading face in opposition to and moveable in synchronization with the first torch, and
  a second deburring device mounted on the cutting table above the slab loading face in opposition to and moveable in synchronization with the second torch, and wherein the first and second air curtains are generated proximate the first and second deburring devices respectively.

21. A cutting table assembly for cutting a steel slab comprising:
  a cutting table including a slab loading face, wherein the slab loading face is constituted by
    a pair of loading sub-faces separated by a slot, and, wherein the torch is mounted in the slot below the slab loading face, and wherein the torch is moveable along the length of the slot;

means for mounting the cutting table for movement between a loading position in which the slab loading face is generally horizontal, and a cutting position in which the slab loading face is oblique;

a torch, wherein the torch is mounted on the cutting table below the slab loading face, wherein: the torch comprises
  a first torch,
  a second torch positioned in the slot below the slab loading face and moveable along the slot, whereby either of the first and second torches, in solo, can perform the flame cut along the entire dimension of the slab;

means for generating first and second air curtains, wherein the means for generating first and second air curtains is disposed between the first and second torches;

a first deburring device mounted on the cutting table above the slab loading face in opposition to and moveable in synchronization with the first torch, and a second deburring device mounted on the cutting table above the slab loading face in opposition to and moveable in synchronization with the second torch, and wherein the first and second air curtains are generated proximate the first and second deburring devices respectively; and a spark shield mounted on each first and second support structure.

22. The cutting table assembly according to claim 21, wherein the spark shield includes:
  a plate mounted on and extending downwardly from the first and second support structure.

* * * * *